United States Patent [19]
Howard

[11] 3,796,101
[45] Mar. 12, 1974

[54] MAXIMUM AND MINIMUM THERMOMETER

[75] Inventor: Charlie Jerry Howard, Asheville, N.C.

[73] Assignee: Sybron Corporation, Rochester, N.Y.

[22] Filed: Apr. 24, 1972

[21] Appl. No.: 246,802

[52] U.S. Cl. ............................ 73/363.7, 116/129 B
[51] Int. Cl. ........................ G01d 4/04, G01k 5/64
[58] Field of Search..... 73/363.7; 116/129 A, 129 B

[56] References Cited
UNITED STATES PATENTS

| | | | |
|---|---|---|---|
| 2,605,736 | 8/1952 | Cook et al. | 116/129 B |
| 2,278,145 | 3/1942 | Milestone et al. | 116/129 T |
| 1,523,123 | 1/1925 | Jacoby | 116/129 A |
| 1,206,094 | 11/1916 | Collinson | 116/129 B |
| 2,457,286 | 12/1948 | Tollefsen et al. | 116/129 B |

FOREIGN PATENTS OR APPLICATIONS 255,835  9/1926  Great Britain .................. 116/129 B Primary Examiner—Richard C. Queisser
Assistant Examiner—Daniel M. Yasich
Attorney, Agent, or Firm—Theodore B. Roessel; Joseph C. MacKenzie

[57] ABSTRACT

A maximum and minimum registering thermometer presents maximum and minimum readings as numbers on movable scales. The scales are on arcuate scale elements comprising nesting, spoked annular elements rotated through one-way and other-way couplings, by the thermometric pointer.

6 Claims, 4 Drawing Figures

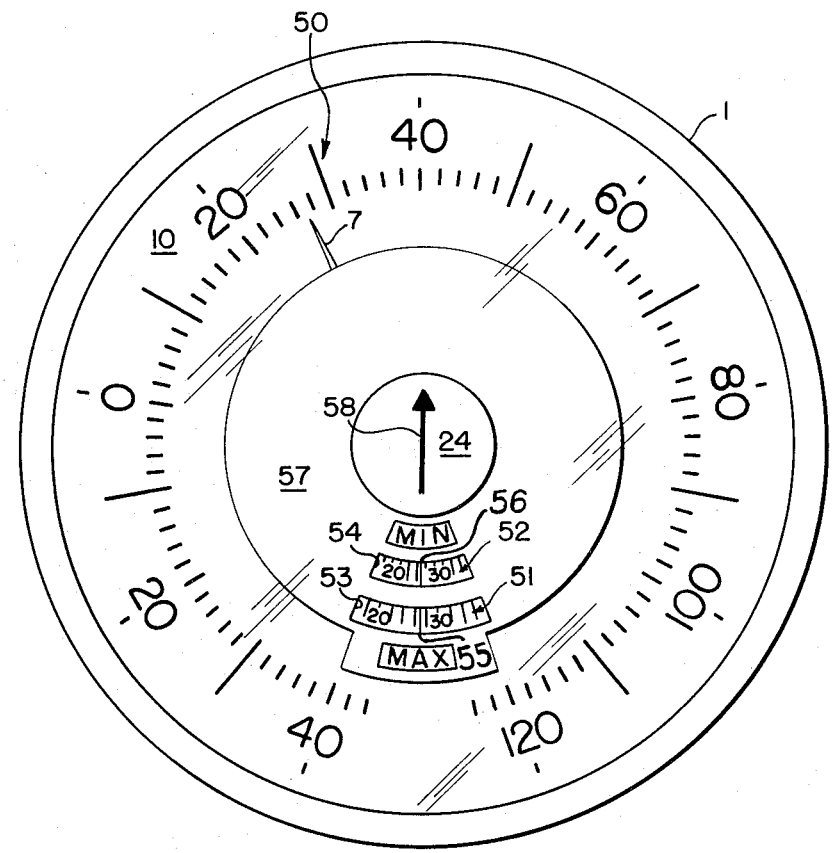
FIG. 2
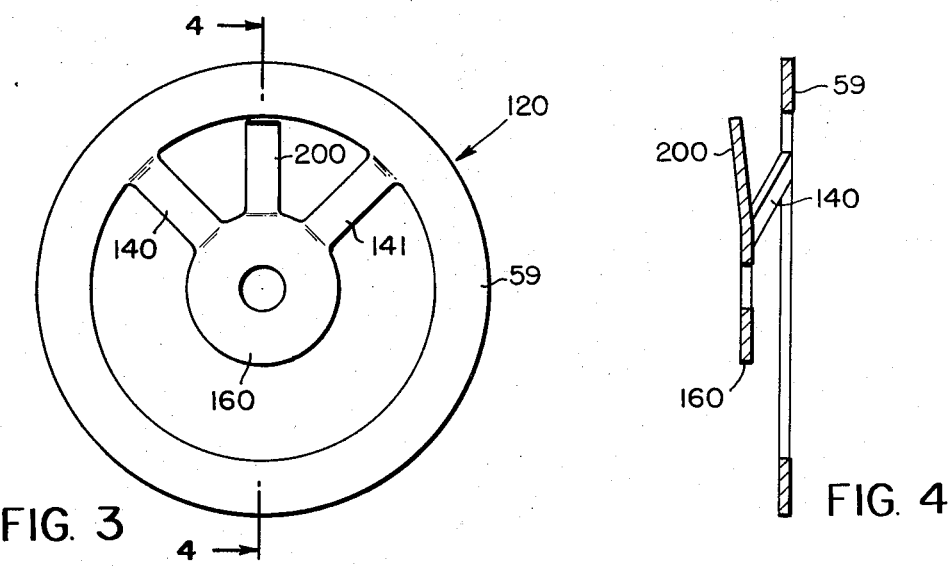
FIG. 3
FIG. 4

MAXIMUM AND MINIMUM THERMOMETER

BACKGROUND OF THE INVENTION

The prior art discloses instruments for indicating current and past values of various conditions, such as temperature, barometric pressure, and so forth. The past values are maxima and minima of the condition, and are read on the same scale as the current value, usually by means of pointers.

SUMMARY OF THE PRESENT INVENTION

In the present invention, an instrument, e.g., a thermometer, functionally like prior art maxima and minima thermometers, registers maxima and minima by moving corresponding scales with respect to a fixed index. This allows segregating the maximum and minimum readings from current readings, and also emphasizes the reading since the major portions of the movable scales can be concealed, giving the effect of presenting a number, expressing the maximum and minimum, while the other numbers are pretty much concealed. The arrangement provides for fresh ornamental effects, and, as well, improves readability.

BRIEF DESCRIPTION OF THE DRAWINGS

FIG. 2 shows a plan view of a thermometer according to the invention; FIGS. 3 and 4 are respective plan and diametral sectional views of a detail of the invention, as embodied in practice.

In FIG. 1, a casing 1 has a right-cylindrical post 2 fixed at its left end to the casing. A bimetallic spiral coil 3 has its inner end 4 fixed to the post 2 and its outer end 5 fixed to a pointer 6. Pointer 6 has an index portion 7, and a hub portion 8, this last journaling the pointer 6 on the post for rotation on an axis which is the axis of the post. This is a typical known arrangement of pointer, coil, post and casing, and has the usual result that, as the temperature of the coil changes, the pointer is rotated to various positions in a vertical plane normal to the plane of the Figure. In FIG. 1, said vertical plane is defined by a scale plate 9 fixed to a transparent cover 10 forming part of casing 1. Accordingly, an arcuate scale (not shown), on plate 9, and centered on the axis of rotation of pointer 6, can be used to define the various positions of index portion 7, in terms of temperature of coil 3.

Figures 1, 2A:
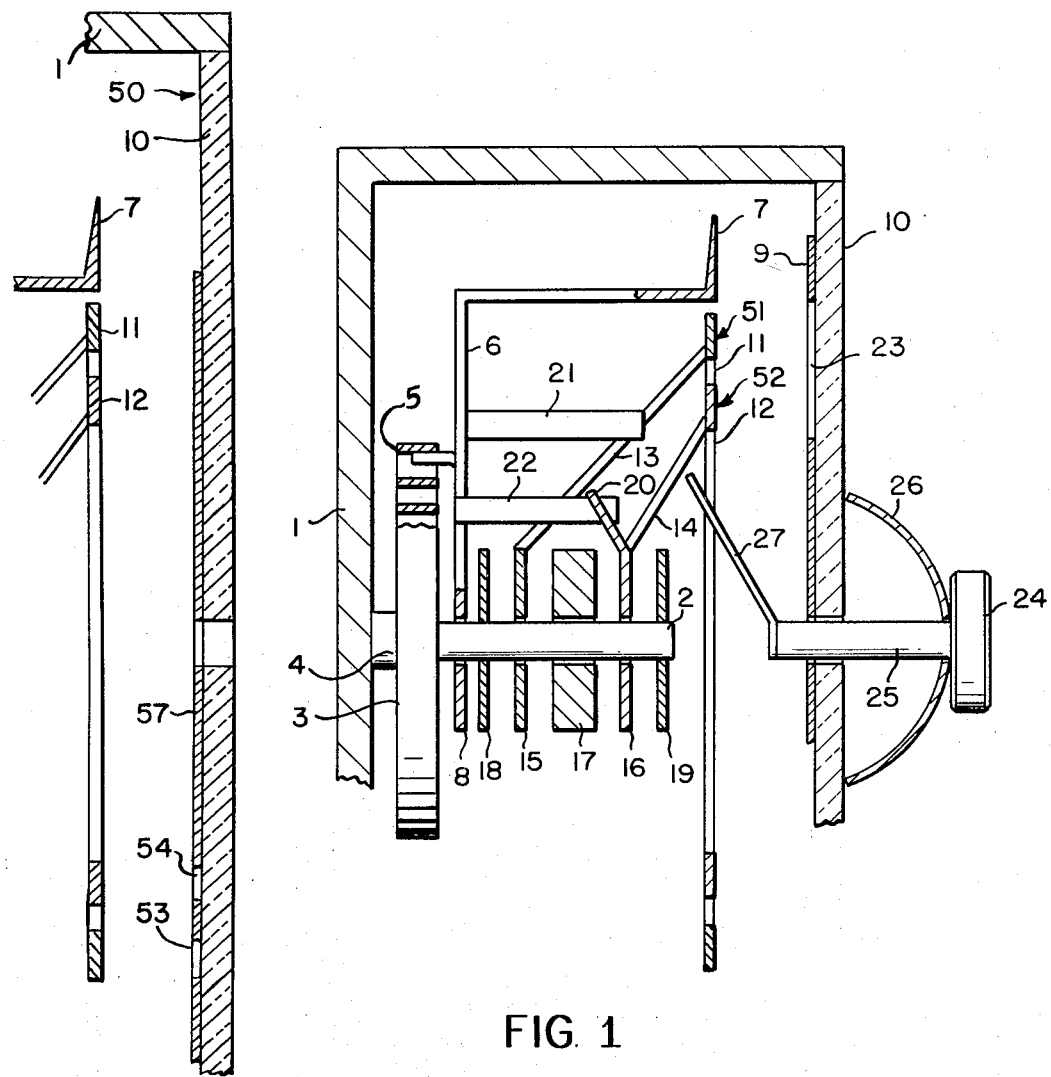
FIG. 1 shows a thermometer according to the invention in a partial sectional view wherein proportions are exaggerated for clarity of description.
FIG. 2A being a fragmentary view of the device of FIG. 2, similar to the view of FIG. 1.

Arcuate scale elements 11 and 12 have respective spokes 13 and 14, which terminate in respective hub portions 15 and 16. The hub portions provide for journalling scale elements 11 and 12 on post 2, analagous to the journalling of pointer 6 on post 2. Elements 11 and 12 are separated by a washer 17, and in turn collectively separate a pair of washers 18 and 19.

As shown, the several hub-portions and washers are spaced from one another and from the post. This is merely for clarity in illustration. In practice, the hub-portions will fit the post substantially precisely, with hub portions 15 and 16, and washers 17, 18 and 19 more or less in frictional engagement with each other. Preferably, washer 17 is a permanent magnet, and hub portions 15 and 16 are made of ferromagnetic material. Washer 17 is fixed to the post 2, so will draw the hub-portions 15 and 16 to it. Washers 18 and 19 act as retainers for the hub portions and are fixed to the post at points providing a spacing from washer 17 a little greater than the thickness of the hub portions 15 and 16. Also, washer 18 will be spaced from hub portion 8.

It is to be observed that the foregoing arrangement of hub portions and washers is one of a number of known conventional arrangements for providing substantially frictionless rotation of hub portion 8 on post 2, while introducing a controlled amount of friction for allowing hub portions 15 and 16 to be rotated substantially freely, yet to remain capable of staying in any given rotary position, by virtue of the friction alone between them and magnet 17.

Pointer 6 is provided with lugs 21 and 22 which respectively form part of a one-way coupling to scale element 11 and part of an other-way coupling to scale element 12. By "one-way coupling," I mean that if the coil temperature increases, and its winding and construction is, say, such as to rotate pointer 6 into the Figure, then lug 21 will strike spoke 13 and rotate scale element 11. By "other-way coupling," therefore, I would mean that if the coil temperature decreased enough, the lug 22 would move out of the paper, and strike a lug 20 fixed to the hub portion 16 and rotate scale element 12. It is to be observed that using the separate lug 20, rather than spoke 14, as part of the other-way coupling, is merely exemplary of a mechanical refinement. Conversely, it is to be noted that if the lug 21 were a little longer, it would provide, with spoke 14, the other-way coupling, as well as the one-way coupling it forms, with spoke 13. What the Figure actually shows, as to the couplings, reflects the design considerations that were found convenient in fabricating actual examples of the instrument.

The use and function of the above structure is that typical of maximum and minimum registering thermometers. Thus, as coil 3 winds and unwinds in response to corresponding temperature fluctuations, pointer 6 rotates one way or another in correspondence with such fluctuations. Scale element 11, however, goes only one-way, and stays were it is put, so to speak, whereas scale element 12 goes only the other way, but also stays where it is put. Thus, if one looks at the instrument from the right, one sees index portion 7, the position of which can be read in terms of a scale (not shown) on plate 9. At the same time, one sees, through a window 23 in plate 9, numbers of the scales (not shown) on scale elements 11 and 12, which numbers read in terms of the highest and lowest temperatures attained by coil 3, up to the time of reading.

A resetting knob 24 is also provided, as is customary, for resetting the scale elements 11 and 12 from time to time, in order to be able to get some idea of when the maximum and minimum temperatures occurred. Knob 24 has fixed thereto a post 25 journaled in the scale plate and normally held, by a spring 26, in the position shown. Affixed to the end of post 25 is a lug 27. The operation of these elements is conventional: to reset, the knob 24 is turned to a position wherein one of the spokes 13 and 14 are between lug 27 and pointer 6, whereupon the knob is pushed in and rotated so that lug 27 picks up the spoke and moves it until the corresponding one of lugs 21 and 22 is contacted. The knob is then released, and the operation is repeated for the other of lugs 21 and 22. In the end, the numbers visible in window 23 will be those corresponding to the position of index portion 7. Thereafter, the instrument is left to its own devices and the vagaries of temperature, until such time as it is desired to reset the scale elements 11 and 12.

FIG. 2 exemplifies one indicating configuration based on the principles of FIG. 1. Thus, there is a temperature scale 50, visible in full, running from a minimum of about −40° F to a maximum of about 120° F. Partially shown are scales 51 and 52, which are on scale elements 11 and 12, respectively. The divisions and numbers of 51 and 52 are, however, the same as those of scale 50. As is evident from the Figure, scale 51 indicates maximum temperature and scale 52 indicates minimum temperature.

Windows 53 and 54, corresponding to the single window 23 in FIG. 1, and having index lines 55 and 56, provide for reading the scales 51 and 52 at the index lines. The windows are in a mask 57 which conceals the structure behind it, except for the index portion 7 of pointer 6, the position of which can therefore be read off on scale 50. The knob 24 may have an arrow 58 thereon which shows the angular position of the lug 27, in spite of this last being concealed by mask 57.

Mask 57 and scale 50, conveniently, may be printed on the cover glass 10. Supposing no structural or dimensional change in the mechanism, this would amount to putting the scale on cover glass 10 around the periphery of plate 9, rather than on it, and to rotating window 23, 180° from the position shown in FIG. 1. Actually, as will be seen from FIG. 2A, mask 57 (shown with some thickness for illustration purposes) is in essence a slightly smaller version of plate 9, whereas case 1 and cover glass 10 are slightly enlarged, as compared to FIG. 1.

It will be observed that the mask 57 for the most part conceals the contents of casing 1. On the other hand, it serves to contrast and intensify the maximum and minimum readings, giving somewhat of a digital effect, so to speak, due to the fact that not much of scales 51 and 52 is visible except a number or two, close in value to the actual reading. Obviously, this effect may be intensified by dimensioning the angular extent of the windows 53 and 54 so that not more than one full number can be seen at a time, but at least one full number is always visible. Again, the windows 53 and 54 could be located on opposite sides of knob 24.

Preferably, the scale elements 11 and 12 are 0.010 inch stainless steel stampings, such as is shown in FIGS. 3 and 4, in the case of element 120, which corresponds to element 12 of FIG. 1.

Element 120 is essentially an annulus 59, having a spoke 140, a hub portion 160, and a lug 200, corresponding to the like-entitled parts 14, 16, and 20 of element 12. In addition, there is also a spoke 141. Not shown are strengthening ribs, upsets, and the like which are preferably embossed in the spokes and annulus for improving their rigidity. A counterpart of element 11 would be quite similar, except to lack the counterpart of lug 200.

The second spoke is provided only for added rigidity. The lesser angular spacing between two spokes is relatively limited since the amount of rotation contemplated is nearly full circle. Functionally, what is required is a certain amount of empty space for the lugs 21 and 22 to move in freely except when driving the respective scale elements. FIGS. 3 and 4, which are about 1 ½ times life-size, and to scale, represent a design for maximizing that empty space while obtaining lightness and compactness of the scale element arrangement. Apart from these things, however, the two scale elements are in essence coaxially mounted dials unequal in radius and having sectors cut out to allow for "one-way" and "other-way" coupling.

It will be evident from the foregoing that various modifications may be made in the mechanism of the thermometer, without departing from the invention. The instrument shown stems from a design for measuring ambient air temperature (so perforations, not shown, may be made in casing 1, for circulation of ambient air inside the casing). However, the illustrated arrangement would be suitable for any type of instrument for indicating both current and past values of one condition or another.

The claims appended hereto contemplate an instrument which will indicate both maxima and minima. However, it is within the scope of the invention to provide for just one or the other thereof, alone.

Having described my invention in accordance with the statutes,

I claim:

1. A maximum and minimum registering device, comprising, in combination, a first indicator, a second indicator, a third indicator, all said three indicators journalled on a post in said registering device, and a sensor responsive to a condition and connected to said first indicator for causing said first indicator to indicate the value of said condition;

said second indicator having a one-way, detachable coupling selectively coupled to said first indicator and being frictionally retained on said post for indicating maximum values of said condition, and said third indicator having an other-way detachable coupling selectively coupled to said first indicator and being frictionally retained on said post for indicating minimum values of said condition;

said second indicator being a first arcuate scale element having a first scale of numbers thereon, said third indicator being a second arcuate scale element having a second scale of numbers thereon;

said device also including a plate fixed on the interior of a crystal of said registering device with respect to and overlying said scales, and having a first window therein through which is visible at least one number of said first scale, said plate also having a second window therein through which is visible at least one number of said second scale.

said one-way detachable coupling providing for moving said first arcuate scale element past said first window for presenting its said numbers to view therethrough, substantially one by one upon movement of said first indicator in one direction, and said other-way detachable coupling providing for moving said second arcuate scale element past said second window for presenting its said numbers to view therethrough, substantially one by one upon movement of said first indicator in the opposite direction.

2. The invention of claim 1, wherein said condition is temperature.

3. The invention of claim 1, wherein said plate conceals said scales, except insofar as said scales are visible through said windows, and wherein the angular extent of each said window is approximately just large enough that only a minor part of the corresponding said scale is visible therethrough.

4. The invention of claim 3 wherein said condition is temperature.

5. The invention of claim 1, wherein said indicators are rotary and mounted for rotation about a common axis, said first arcuate scale element having a first radial spoke mounting it for rotation about said axis, said second arcuate scale element having a second radial spoke mounting it for rotation about said axis, one of said spokes overlying the other along the direction of said axis;

said first indicator having lug means projecting along the direction of said axis so far as to contact either said spoke upon rotation of said first indicator.

6. The invention of claim 5, wherein said condition is temperature.

* * * * *